United States Patent Office 3,291,860
Patented Dec. 13, 1966

3,291,860
UNSATURATED ESTERS OF 1,3-CYCLIC ACETALS AS MONOMERS FOR UNSATURATED POLYESTER RESINS
John David Nordstrom, Minneapolis, Minn., assignor to Archer-Daniels-Midland Company, Minneapolis, Minn., a corporation of Delaware
No Drawing. Filed Jan. 29, 1965, Ser. No. 429,121
16 Claims. (Cl. 260—866)

The present invention relates to novel curable polyester compositions and more particularly to ethylenically unsaturated polyester compositions containing novel curing agents.

The use of unsaturated polyester resins in coating compositions which are capable of air drying to cured, i.e., cross-linked, coatings is well known in the art. Most of these resins employ an ethylenically unsaturated liquid monomer in combination with a free radical forming compound as the curing agent. The free radical forming compound acts as an initiator in the copolymerization of the ethylenically unsaturated double bonds of the polyester resin molecules and the added monomer. Preferred added monomers are in particular styrenes and acrylic monomers. The free radical forming compound such as a peroxide is added to the coating composition shortly before the use thereof and allows the rapid formation of a hard, cured coating on exposure to atmospheric conditions. The disadvantage of these curing compositions is that in order to obtain a coating composition which air dries fairly rapidly it is necessary to employ highly reactive monomers. These highly reactive monomers, however, have a tendency to polymerize prematurely before exposure to the atmosphere, thus causing a short shelf life for the coating compositions. If on the other hand the premature polymerization of the added liquid monomer is prevented by the addition of an inhibitor, the inhibiting action will continue even after addition of the free radical compound and on exposure to the atmosphere thereby considerably retarding the curing reaction so that extremely long drying times are necessary to obtain a dry and hardened coating.

It is an object of the present invention to provide novel curable polyester compositions.

It is another object of the present invention to provide curable polyester coating compositions having long shelf lives before and after addition of a free radical forming compound which can be air dried within short periods of time.

It is still another object of the present invention to provide a novel curing agent for unsaturated polyester compositions.

It is a further object of the present invention to provide cured polyester compositions of improved chemical and physical properties.

Other objects will become apparent from the following description and claims.

The objects of the present invention are accomplished by an ethylenically unsaturated polyester resin containing a curing agent comprising a cyclic acetal having the general formulas (I) 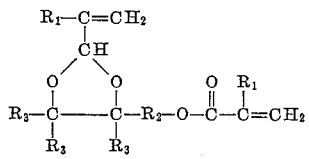

(II) 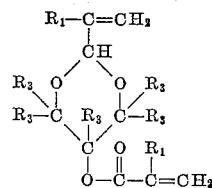

and (III) 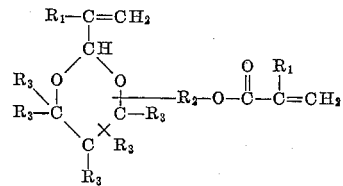

in which $R_1$ is a radical selected from the class consisting of hydrogen and the methyl group, $R_2$ is an alkylene radical of one to eighteen carbon atoms, and $R_3$ is a radical selected from the class consisting of hydrogen and alkyl radicals having from one to eight carbon atoms. In a preferred embodiment of the present invention the bifunctional cyclic acetals defined by Formulas I, II, and III are employed in combination with a polymerizable monovinyl monomer.

In accordance with the present invention it was discovered that the cyclic acetals defined by Formulas I, II, and III are capable of cross-linking unsaturated polyesters at room temperatures on addition of a free radical forming compound and on exposure to the atmosphere within a short period of time, even when inhibited to assure a long shelf-life both before and after the addition of a free radical forming compound. It should be recognized, however, that the addition of the free radical forming compounds is only necessary in the formation of air drying compositions. The curing of unsaturated polyesters containing the cyclic acetals can be achieved without the free radical forming compound by heating at elevated temperatures.

The unsaturated polyesters which are cured by the addition of the cyclic acetals defined by Formulas I, II, and III encompass a wide variety of resins since the only requirement is that the polyester contain ethylenic unsaturation and be in liquid or soluble form. The degree of unsaturation necessary to obtain the formation of a cured polymer can vary widely and can be as low as one ethylenic bond per molecule although it is generally preferred to employ polyesters having a higher degree of unsaturation. With increasing unsaturation in the polyester molecules, faster curing rates can be realized in view of the greater number of sites available for cross-linking. However, with highly unsaturated polyesters other factors, such as the activity of the comonomer or the free radical compound may determine the rate of curing. The polyesters employed in combination with the curing agents of the present invention are generally obtained by the condensation of one or more dicarboxylic acids or anhydrides and one or more diols, in which either one or more of the diols and/or one or more of the dicarboxylic acids or anhydrides are ethylenically unsaturated. Additionally the polyesters may also be obtained by copolymerization of saturated dicarboxylic acids or anhydrides with saturated diols in the presence of an ethylenically unsaturated monocarboxylic acid or monobasic alcohol. Examples of suitable unsaturated dicaroxylic acids includes maleic acid, or maleic anhydride, ,5-cyclohexene dicarboxylic acid, fumaric acid, itaconic cid, glutaconic acid, glutaconic anhydride and similar cids, and anhydrides. Examples of ethylenically unsaturated alcohols include 2-butene-1,4-diol, 1,1-dihydroxymethylcyclohex(3)ene, 1,2-dihydroxymethylcyclohex(4)ne, 2,3-dihydroxymethylbicyclo(2,2,1)hept(5)ene. Examples of unsaturated monocarboxylic acids include crylic acid, methacrylic acid, crotonic acid, unsaturated at acids, and similar compounds. Examples of unsaturated monobasic alcohols include allyl alcohol, methallyl lcohol, and similar compounds. Instead of diols or n combination with diols it is further possible to employ insaturated epoxides to condense with the dicarboxylic cids. The formation of unsaturated polyester resins uitable for use in coating applications is well known in he art and thus need not be further detailed here.

The cyclic acetals employed in the present invention is curing agents are preferably prepared by transesterification of cyclic acetals containing a hydroxyl group instead of the $CH_2=CR_1-CO_2$ acid group shown in the formulas I, II, and III with an ester of acrylic or methacrylic acid. In general, methyl or ethyl acrylates or methacrylates are employed since the resulting alcohol can be readily volatilized from the reaction mixture as is necessary to achieve the transesterification. Transesterification reactions are well known in the art and are generally carried out at elevated temperatures to allow he alcohol formed from the ester employed to be volatilized and removed from the reaction mixture comprising he cyclic acetal alcohol and the unsaturated ester. Alkali metal alkoxides are generally employed as accelerators for the reaction. Such alkali metal alkoxides can be formed in situ from the alcohol present in the reaction mixture or an added alcohol and an added finely dispersed alkali metal.

Particularly preferred transesterification catalysts are sodium methylate and ethylate. If desired, the reaction can be carried out at reduced pressures. The desired bifunctional cyclic acetal is obtained by distillation from the reaction mixture. In general it is preferred to employ an excess of the acrylic or methacrylic acid ester, even though the cyclic acetal and the unsaturated ester react in equimolar amounts. In view of the high reactivity of the unsaturated acid group, stray free radicals which may be present in, or are introduced into, the reaction mixture can cause the polymerization of the unsaturated ester prior to reaction with the cyclic acetal, or can cause the novel bifunctional acetal to polymerize. Such premature polymerization of the unsaturated acid group is readily inhibited by the use of known polymerization inhibitors for the acid group such as hydroquinone and similar compounds which do not interfere in the transesterification. Other suitable inhibitors include di-β-naphthol, tertiary butyl catechol, pyrogallol, and the like. Although the transesterification reaction is preferred in the formation of the novel cyclic acetals of the present invention, it is to be understood that the direct esterification of methacrylic acid or acrylic acid with the cyclic acetal alcohols may similarly be employed. In still another method, the cyclic acetal alcohol may be reacted with the unsaturated acid chloride.

The cyclic acetal containing the hydroxyl group is prepared by the reaction of acrolein or methacrolein with a triol. The triols employed in the formation of the cyclic acetals of the present invention contain two hydroxyl groups on adjacent carbon atoms, if it is desired to form the dioxolane ring containing cyclic acetal, and two hydroxyl groups on carbon atoms which are removed from each other by a third carbon atom, if it is desired to form the dioxane ring containing cyclic acetal. Suitable triols therefore are glycerol, 1,2,4-butanetriol, 1,2,5-pentanetriol, 1,3,5-pentanetriol, 1,2,6-hexanetriol, 2,3,6-hexanetriol, 2-methyl-1,2,5-pentanetriol, 2-methyl-2,3,6-hexanetriol, 1,3,7-heptanetriol, 1,2,7-heptanetriol, 1,2,8-octanetriol, 2,4,4 - trimethyl-1,2,5-pentanetroil, 1,2,10-decanetriol, 1,3,10-decanetriol, 2,4,10-decanetriol, 1,3,8-octanetriol, 2,3,8-octanetriol, 3,4,8-octanetriol, 2,3-dimethyl-2,3,8 - octanetriol, 1,2,5 - hexanetriol, 2-methyl-1,2,6-heptanetriol, 2,3,9 - decanetriol, 2 - methyl-2,4,8-nonanetriol, and the like.

The reaction of the acrolein, or methacrolein, with the triol is conveniently carried out by heating a mixture of the unsaturated aldehyde and the triol containing preferably an excess of the aldehyde over the stoichiometric requirement for the reaction dissolved or suspended in a suitable liquid such as benzene or trichloroethylene, etc. The reaction is generally carried out under conditions which allow the removal of water formed by the cyclization. The reaction is catalyzed by an acid catalyst and particularly by a sulfuric acid catalyst such as sulfuric acid, toluene sulfonic acid, benzene sulfonic acid, ethane sulfonic acid, and the like. The acid is employed in concentrations of 0.01 to 0.1 mole percent based on the unsaturated aldehyde present.

Cyclic acetals suitable as polyester curing agents include such dioxolanes as 2-(2-vinyl-1,3-dioxolan(4)yl)ethyl methacrylate,
2-vinyl-1,3-dioxolan(4)yl methyl methacrylate,
4-(2-vinyl-1,3-dioxolan(4)yl) butyl methacrylate,
4-(2-vinyl-5-methyl-1,3-dioxolan(4)yl) butyl methacrylate,
2-(2-vinyl-5-methyl-1,3-dioxolan(4)yl) ethyl methacrylate,
2-vinyl-5-ethyl-1,3-dioxolan(4)yl methyl methacrylate,
4-(2-vinyl-5,5-dimethyl-1,3-dioxolan(4)yl) butyl methacrylate,
4-(2-vinyl-1,3-dioxolan(4)yl) butyl acrylate,
6-(2-vinyl-1,3-dioxolan(4)yl) hexyl acrylate,
8-(2-vinyl-1,3-dioxolan(4)yl) octyl acrylate,
2-isopropenyl-1,3-dioxolan(4)yl methyl methacrylate,
4-(2-isopropenyl-1,3-dioxolan(4)yl) butyl methacrylate,
2-(2-isopropenyl-1,3-dioxolan(4)yl) isopropyl acrylate,
2-(2-isopropenyl-5-ethyl-1,3-dioxolan(4)yl) isopropyl acrylate,
2-(2-isopropenyl-5-ethyl-1,3-dioxolan(4)yl) ethyl acrylate,
4-(2-isopropenyl-5,5-dimethyl-1,3-dioxolan(4)yl) butyl methacrylate,
2-isopropenyl-5-isopropyl-1,3-dioxolan(4)yl methyl methacrylate,
4-(2-vinyl-4,5-dimethyl-1,3-dioxolan(4)yl) butyl methacrylate, and the like.

Suitable dioxane curing agents produced by the described synthesis process include 2-vinyl-1,3-dioxan(5)yl methacrylate,
2-vinyl-1,3-dioxan(4)yl methyl methacrylate,
4-(2-vinyl-1,3-dioxan(4)yl) butyl methacrylate,
2-isopropenyl-1,3-dioxan(5)yl methacrylate,
2-isopropenyl-1,3-dioxan(4)yl methyl methacrylate,
4-(2-vinyl-1,3-dioxan(5)yl) butyl methacrylate,
4-(2-vinyl-5-ethyl-1,3-dioxan(4)yl) butyl acrylate,
4-(2-vinyl-4,5-dimethyl-1,3-dioxan(4)yl) ethyl acrylate,
5-(2-vinyl-1,3-dioxan(4)yl hexyl acrylate,
4-(2-isopropenyl-4,5,6-trimethyl-1,3-dioxan(4)yl) butyl acrylate,
3-(2-isopropenyl-6-ethyl-1,3-dioxan(4)yl) propyl methacrylate,
4-(2-vinyl-4,5,6-trimethyl-1,3-dioxan(5)yl) acrylate,
2-vinyl-6,6-diethyl-1,3-dioxan(4)yl methyl methacrylate,
2-(2-isopropenyl-5,5,6-trimethyl-1,3-dioxan(4)yl) ethyl acrylate,
2-(2-vinyl-4,6-diethyl-1,3-dioxan(5)yl) ethyl methacrylate,
8-(2-isopropenyl-6-butyl-1,3-dioxan(4)yl) octyl acrylate, and the like.

The preparation of the cyclic acetals employed in the present invention is further illustrated by the following procedure which is generally applicable: To a- two-liter, three-necked flask fitted with an eight-inch Vigreux column, topped with a variable take-off head, a stirrer and a thermometer, were charged 344 grams (2 moles) of 2-vinyl-4-(4-hydroxybutyl)-1,3-dioxolane, 400 g. (4 moles) of methyl methacrylate, 15 g. of monomethyl ether of hydroquinone as stabilizer for the methyl methacrylate, and 20 g. of a solution of 5% sodium in methanol, as the catalyst for the transesterification. The mixture was heated to reflux and the methanol methyl methacrylate azeotrope was removed by distillation at a reflux ratio of five to one. After two hours, 5 g. of monomethyl ether of hydroquinone and 20 g. of 5% sodium in methanol were added and the distillation continued until the vapor temperature reached 99° C. and the solution temperature reached 128° C. Methyl methacrylate was continuously added to the reaction mixture to replace the volume of distillate removed. The reaction mixture was filtered and the excess methyl methacrylate was removed from the filtrate by distillation at reduced pressure. The residual liquid was distilled between 118° to 120° C. at 0.8 mm. mercury pressure. The distillate was a mixture of the desired bifunctional cyclic acetal and the cyclic acetal alcohol. The alcohol was removed by filtering the mixture through a column of activated alumina. A yield of 364 g., or 76% of 4-(2-vinyl-1,3-dioxolan(4)yl) butyl methacrylate was obtained.

The preparation of the cyclic acetals is further described in copending application Serial No. 429,114, filed Jan. 29, 1965, filed herewith.

Although it is possible to employ the cyclic acetal as the sole cross-linking monomer it is generally preferred to employ the cyclic acetal in combination with a vinyl monomer. Suitable vinyl monomers are styrene and ring substituted styrenes, acrylic esters such as ethyl acrylate, methyl methacrylate, vinyl ethers such as methyl vinyl ether and ethyl vinyl ether, and unsaturated esters such as vinyl acetate and the like. The use of this type of vinyl monomer to achieve the curing of unsaturated polyesters is also known in the art.

The concentration ranges in which the unsaturated polyester, the cyclic acetal, and the vinyl monomer can be employed can be varied widely. The concentration of the unsaturated polyester can vary from 20 to 80 percent but preferably is maintained within a range of 50 to 70 percent. The concentration of the bifunctional cyclic acetal can vary from 1 to 50 percent but is preferably maintained in the range of 1 to 20 percent. Although it is not necessary to employ the vinyl monomer to accomplish the curing of the unsaturated polyester, the vinyl monomer can be employed up to a concentration of about 80 percent. A preferred concentration range is from 30 to 50 percent. The foregoing concentration ranges are based on the weight of the mixed composition.

The free radical compound employed in the curing reaction is generally a peroxide although other free radical forming compounds such as azonitriles may also be employed. Any peroxide which is liquid or soluble in the coating composition is suitable. Specific examples of such peroxides are methyl ethyl ketone peroxide, benzoyl peroxide, di-tert-butyl peroxide, tert-butyl hydroperoxide, isopropyl peroxydicarbonate, dichlorobenzoyl peroxide, lauroyl peroxide, acetyl peroxide, tert-butyl peracetate, tert-butyl perbenzoate, di-cumyl peroxide, diethyl peroxide, di-tert-amyl peroxide, and cyclohexyl hydroperoxide. The free radical forming compound is employed in such concentration as is required to rapidly initiate the polymerization of the cyclic acetal and the added vinyl monomer when employed. This concentration may vary depending on the curing conditions and the particular polyester employed but is generally within the range of 0.001 to 10 percent by weight of the added monomer.

In order to avoid the premature cross-linking of the unsaturated polyester coating compositions of the present invention, the composition is inhibited by the addition of any of the well-known vinyl inhibitors, the preferred of which is hydroquinone. Inhibitors generally fall within the class of aromatic compounds containing one or more phenolic hydroxyl groups or aromatic amino groups. Specific examples of inhibitors employed for vinyl monomers other than hydroquinone are di-β-naphthol, tert-butyl catechol, pyrogallol, mono-methyl ether of hydroquinone, copper naphenate, N,N'-diphenyl-p-phenylenediamine and the like. The activity of the cyclic acetals employed in the compositions of the present invention to rapidly cure the coating composition at room temperature on addition of the free radical forming compound and on exposure to atmospheric conditions remains unaffected by the particular type of inhibitor employed. The curable polyester compositions of the present invention can be modified by the addition of dryers, pigments, dyes or tints in accordance with prior art methods.

The invention is further illustrated by the following examples. Unless otherwise noted, all units of quantity are by weight.

EXAMPLES I TO IV

To samples of a terpolymer of diethylene glycol, tetrahydrophthalic anhydride and maleic anhydride employed in a weight ratio of 3.3:1:2 having a viscosity of 7.5 stokes at 70% non-volatile content in styrene were added styrene and combinations of styrene and 4-(2-vinyl-1,3-dioxolan(4)yl) butyl methacrylate inhibited with about 2.0% of hydroquinone as set forth in Table I. To each of the resulting compositions was added 0.05 weight percent of cobalt in the form of the naphthenate based on the polyester compositions and 1 weight percent of methyl ethyl ketone peroxide based on the polyester compositions. Films were drawn down by a drawdown bar to give a 0.003" wet film and allowed to air dry at room temperature. The shelf-life of the resin, i.e., the time elapsed before cross-linking of the composition, as shown by gelling, occurs in a closed container, was measured as were the properties of the coating set forth in Table I.

Table I

| Ex. No. | Concen. of Polyester in Percent | Concen. of Styrene in Percent | Concen. of Comonomer in Percent | Shelf Life in Hrs. | Time Required to Pass 500 g. "Zapon" Test (Hours) | Acetone Resistance [1] | Mar Resistance [1] |
|---|---|---|---|---|---|---|---|
| I | 50 | 50 | | 2 | 4.6 | 0 | 0 |
| II | 50 | 47.5 | 2.5 | 22 | 4.5 | 0 | ++ |
| III | 50 | 45 | 5.0 | 100 | 4.5 | + | ++ |
| IV | 50 | 40 | 10 | 100 | 4.5 | ++ | + |

[1] 0=same as control. +=improvement over control. ++=substantial improvement over control.

The "Zapor" tester consists essentially of a strip of one-inch wide iron bar bent in the form of a V, one leg of which is about one inch long and the other leg of which is about three inches long. The angle between the legs is about 135°. The one-inch leg is wrapped in aluminum foil and a 500 g. weight is placed on the leg which in turn is placed on the film to be tested. After five seconds the weight is removed and the time necessary for the tester to fall over on the three-inch leg within five seconds after the removal of the weight is measured. The increased hardening of the film is indicated by shorter periods of time required to pass the test.

From the foregoing data it is apparent that although the cyclic acetal containing compositions have long shelf lives as a result of being inhibited, the inhibitor has no effect on the air drying properties. The table also shows the improvement obtained in solvent resistance and mar resistance by the addition of the bifunctional cyclic acetal monomer.

EXAMPLES V TO X

The shelf life and the air drying properties of unsaturated polyester compositions were measured employing the various curing agents indicated in Table II. In all examples the polyester employed as a 1:2:3.15 tetrahydrophthalic anhydride/maleic anhydride/diethylene glycol resin.

The resin (50 parts) was admixed with 45 parts of styrene and 5 parts of the monomer or comonomer shown in Table II. To the compositions were also added 0.05% of cobalt in the form of cobalt naphthenate, 1% of methyl ethyl ketone peroxide, and the indicated percentage of hydroquinone, the percentages being based on the total composition. Coatings were prepared from the compositions shown in the table as described in the foregoing examples. The following results were obtained.

EXAMPLE XI

A coating composition is formed by admixing 60 parts of the polyester and 40 parts of the cyclic acetal of Example II and adding 0.1% based on the composition of hydroquinone and 1.0% based on the composition of methyl ethyl ketone. A fast air drying coating composition is obtained.

EXAMPLE XII

A coating composition as illustrated in Example VIII is prepared except that 5 parts of 4-(2-isopropenyl-1,3-dioxolan(4)yl) butyl methacrylate is employed instead of the cyclic acetal of Example VIII. Similar coating results are obtained.

EXAMPLE XIII

A coating composition as illustrated in Example VIII is prepared except that 5 parts of 2-vinyl-5-ethyl-1,3-dioxan(5)yl methyl methacrylate is employed instead of the cyclic acetal of Example VIII. Similar coating results are obtained.

The foregoing examples have illustrated the improved properties obtained with the coating compositions of the present invention and have further shown that good drying properties can be combined with long shelf life by using the described bifunctional cyclic acetals. Instead of using a combination of styrene and the bifunctional cyclic acetals, the cyclic acetal per se can be combined with the polyester. Other monovinyl monomers of the type above described in combination with the bifunctional cyclic acetal can be similarly employed to achieve the desired improvement in properties. Since the reactivity of the described curing systems is only dependent on the existence of an ethylenically unsaturated bond in the coating resin, it will be apparent that other coating resins

*Table II*

| Example No. | Monomer or Comonomer | Percent Hydroquinone | Shelf Life in Hrs. | Non-Transfer in Hrs. | Hrs. Time Required to Pass "Zapon" Test | Tack Free in Hrs. |
|---|---|---|---|---|---|---|
| V | 4-(2-vinyl-1,3-dioxolan(4)yl) butyl methacrylate | 0 | 0.6 | 1.2 | 1.9 | 6.0 |
| VI | Ethylene glycol dimethacrylate | 0 | 0.5 | 1.8 | 2.5 | 6.0 |
| VII | Styrene | 0 | 0.4 | 1.4 | 2.5 | 6.0 |
| VIII | 4-(2-vinyl-1,3-dioxolan(4)yl) butyl methacrylate | 0.12 | >168 | 2.4 | 2.8 | 6.0 |
| IX | Ethylene glycol dimethacrylate | 0.12 | >168 | 2.3 | 4.0 | 7.0 |
| X | Styrene | 0.12 | >168 | 2.4 | 4.5 | >8.0 |

By non-transfer is meant the time required before none of the coating is lifted when contacted, and by tack-free is meant the time required before the coating feels tack-free to the touch. Although these tests are qualitative they are indicative of the air drying properties of the compositions. The foregoing table illustrates that even in the absence of inhibitors the bifunctional vinyl acetals employed in the compositions of the present invention improve the shelf life of the coating compositions and yet result in faster drying times as compared to compositions containing solely styrene as a curing monomer and as compared to other bifunctional comonomer modified compositions. The addition of the inhibitor greatly lengthens the shelf life of all compositions but affects the drying properties of the cyclic acetal modified coating compositions the least. Thus, the drying properties as measured by the "Zapon" test show that the compositions modified with the bifunctional cyclic acetal are 60% improvement over the coating compositions employing solely styrene as the curing monomer and 42% improved over other bifunctional monomer modified coating compositions.

containing such unsaturation can be employed in the manner disclosed in the foregoing examples.

It will be recognized that many modifications and variations of the foregoing coating compositions can be made without departing from the spirit and scope of the present invention and it is intended to include such in the invention as described hereinabove and as defined in the appended claims.

What is claimed is:

1. A coating composition comprising an unsaturated polyester obtained by the condensation of diol with dicarboxylic acid and as a curing agent for said polyester a mixture of a vinyl monomer and a cyclic acetal having a formula selected from the class consisting of:

$$R_1-C=CH_2$$
$$|$$
$$CH$$
$$/ \; \backslash$$
$$O \quad\quad O \quad\quad\quad O \;\; R_1$$
$$| \quad\quad | \quad\quad\quad\quad || \;\; |$$
$$R_3-C\!-\!-\!-\!C-R_2-O-C-C=CH_2$$
$$| \quad\quad |$$
$$R_3 \quad R_3$$

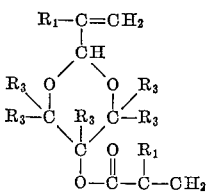

and

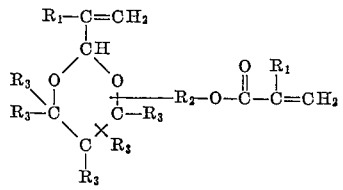

wherein $R_1$ is a radical selected from the class consisting of hydrogen and the methyl group, $R_2$ is an alkylene radical of 1 to 18 carbon atoms, and $R_3$ is a radical selected from the class consisting of hydrogen and alkyl radicals having from 1 to 8 carbon atoms.

2. A coating composition comprising (A) an unsaturated polyester obtained by the condensation of diol with dicarboxylic acid, and (B) a curing agent for said polyester of (1) a vinyl monomer selected from the class consisting of styrene, ring-substituted styrenes, acrylic esters, vinyl ethers, and vinyl acetate, and (2) from 1% to 20% by weight of the coating composition of a cyclic acetal having a formula selected from the class consisting of:

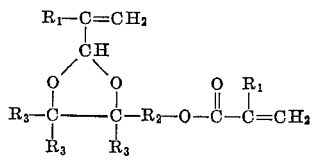

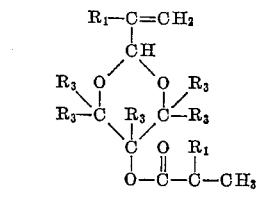

and

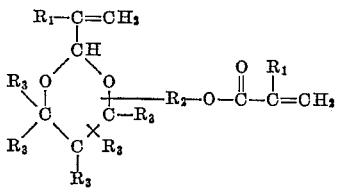

wherein $R_1$ is a radical selected from the class consisting of hydrogen and the methyl group, $R_2$ is an alkylene radical of 1 to 18 carbon atoms, and $R_3$ is a radical selected from the class consisting of hydrogen and alkyl radicals having from 1 to 8 carbon atoms.

3. The coating composition of claim 2 wherein the cyclic acetal is a 1,3-dioxolan(4)yl alkylene ester of an alpha-beta-ethylenically unsaturated hydrocarbon acid having from 3 to 4 carbon atoms, wherein the alkylene group contains from 1 to 18 carbon atoms, said dioxolanyl group being bonded in the two position to the unsaturated carbon atom of a terminally unsaturated alkenyl group of 2 to 3 carbon atoms.

4. The coating composition of claim 2 wherein the cyclic acetal is 4-(2-vinyl-1,3-dioxolan(4)yl) butyl methacrylate.

5. The composition of claim 2 containing a free radical forming compound and an inhibitor.

6. The composition of claim 2 containing a peroxide and a phenolic inhibitor.

7. The composition of claim 5 wherein the inhibitor is hydroquinone.

8. The composition of claim 2 wherein the unsaturated polyester resin contains maleic ester groups.

9. A coating composition comprising from 20 to 80% by weight of the composition of an ethylenically unsaturated polyester obtained by the condensation of diol with dicarboxylic acid from 1 to 50% by weight of the coating composition of a cyclic acetal having a formula selected from the class consisting of

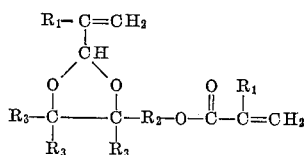

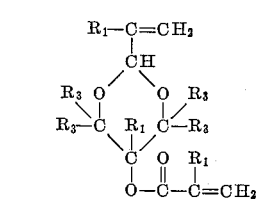

and

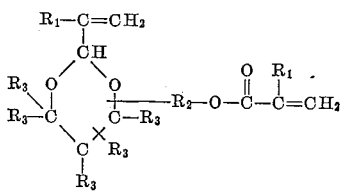

wherein $R_1$ is a radial selected from the class consisting of hydrogen and the methyl group, $R_2$ is an alkylene radical of 1 to 8 carbon atoms, and $R_3$ is a radical selected from the class consisting or hydrogen and alkyl radicals having from 1 to 8 carbon atoms, and from 30 to 50% by weight of the total composition of a monovinyl monomer.

10. The coating composition of claim 9 wherein the vinyl monomer is styrene.

11. The coating composition of claim 9 containing a peroxide and a phenolic polymerization inhibitor.

12. The coating composition of claim 11 wherein the inhibitor is a hydroquinone.

13. The coating composition of claim 9 wherein the cyclic acetal is 4-(2-vinyl-1,3-dioxan(4)yl) butyl methacrylate.

14. The coating composition of claim 9 wherein the cyclic acetal is 4-(2-isopropenyl 1,3-dioxolan(4)yl) butyl methacrylate.

15. The coating composition of claim 9 wherein the cyclic acetal is 2-vinyl-5-ethyl-1,3-dioxan(5)yl methyl methacrylate.

16. A cured coating comprising the cross-linked composition of claim 1.

References Cited by the Examiner
UNITED STATES PATENTS

| | | | |
|---|---|---|---|
| 2,852,487 | 9/1958 | Maker | 260—861 |
| 2,979,514 | 4/1961 | O'Brien | 260—867 |
| 3,058,934 | 10/1962 | Ikeda | 260—867 |
| 3,184,441 | 5/1965 | Fang | 260—340.9 |
| 3,210,441 | 10/1965 | Dowling et al. | 260—867 |

MURRAY TILLMAN, *Primary Examiner.*

SAMUEL H. BLECH, J. T. GOOLKASIAN,
*Assistant Examiners.*